UNITED STATES PATENT OFFICE.

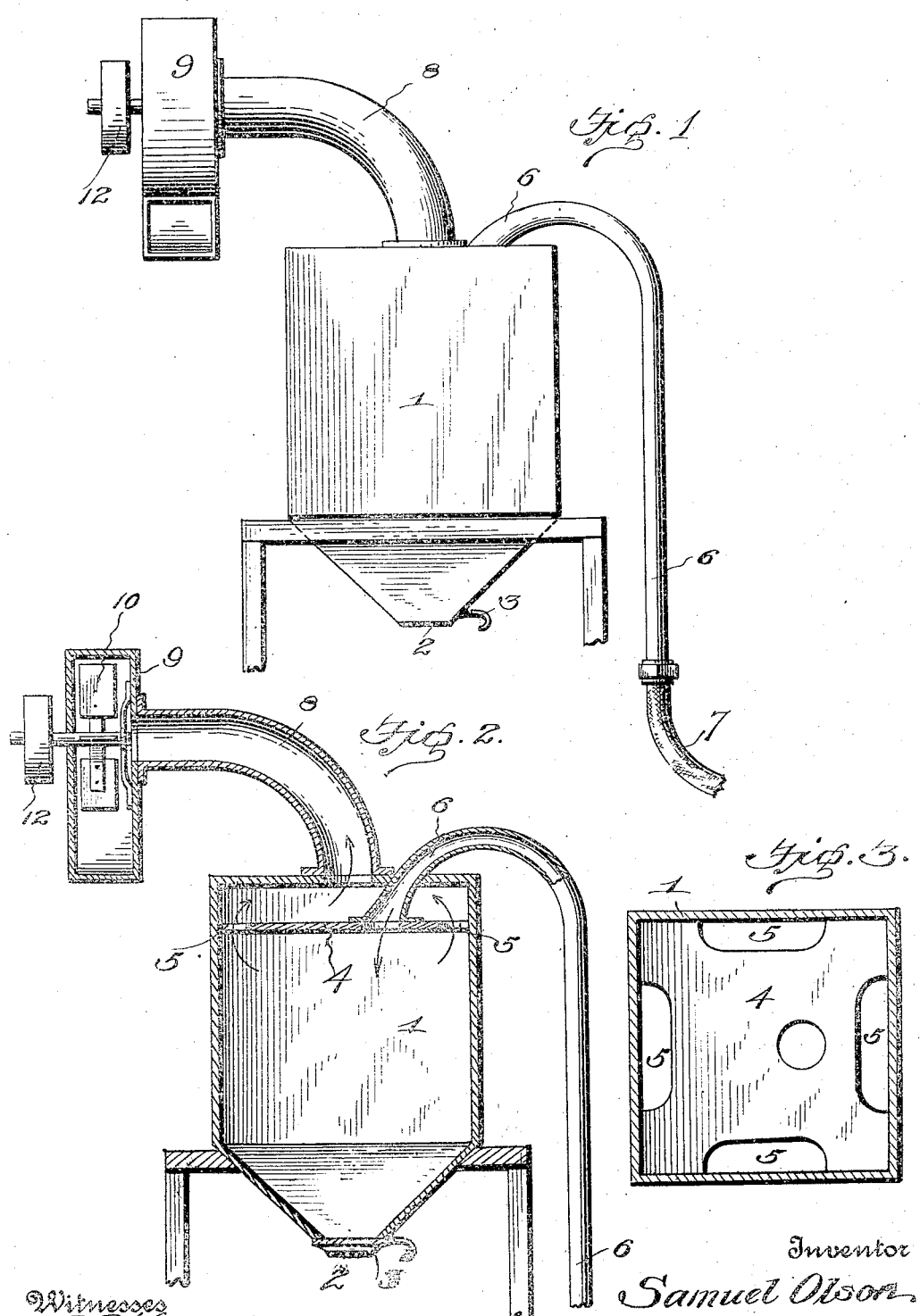

SAMUEL OLSON, OF CHICAGO, ILLINOIS.

PNEUMATIC GRAIN-ELEVATOR.

No. 795,412.        Specification of Letters Patent.        Patented July 25, 1905.

Application filed February 6, 1905. Serial No. 244,418.

*To all whom it may concern:*

Be it known that I, SAMUEL OLSON, a citizen of the United States, residing at Chicago, in the county of Cook and State of Illinois, have invented certain new and useful Improvements in Pneumatic Grain-Elevators; and I do declare the following to be a full, clear, and exact description of the invention, such as will enable others skilled in the art to which it appertains to make and use the same.

This invention relates to improvements in pneumatic grain-elevators.

The object of the invention is to provide an elevator of this character whereby grain may be removed or unloaded from cars, boats, or other places and elevated into a suitable tank or receptacle from which it may be deposited into a weighing-hopper or other desired receptacle, the grain being thoroughly cleaned and freed from all dirt and dust while being deposited into said tank or receptacle.

With the above and other objects in view the invention consists of certain novel features of construction, combination, and arrangement of parts, as will be hereinafter described and claimed.

In the accompanying drawings, Figure 1 is a side elevation of the invention. Fig. 2 is a vertical sectional view of the same; and Fig. 3 is a horizontal sectional view through the grain receptacle or tank, taken above the partition.

In the embodiment of the invention I provide a tank or receptacle 1, which may be of any suitable size or capacity, but which is preferably capable of holding a car-load. The lower end of the tank is preferably inclined inwardly toward the center to a centrally-disposed discharge-opening 2, in which is arranged a sliding valve or gate 3. Near the upper end of the tank is arranged a horizontal transversely-disposed partition 4, in which along two or more of its edges are formed draft-openings 5. Passing through the upper end of the tank 1 and through the partition 4 is the end of a grain-suction pipe 6, to the lower end of which may be connected a flexible suction-hose 7, adapted to be run into a car or into the hull of a vessel and through which and the pipe 6 is adapted to be drawn the grain contained in said car or boat. Above the tank 1 and communicating with the same at a point above the partition 4 is an air-suction pipe 8, said pipe being adapted to enter the tank through the top, as shown, or through the sides of the same above said partition. The opposite end of the pipe 8 is connected with a fan-casing 9, in which is arranged a fan 10, on the shaft of which is mounted a drive-pulley 12, with which is adapted to be connected any suitable driving mechanism. (Not shown.)

When the fan 10 is operated, a strong suction will be created through the pipe 8, thus exhausting the air from the tank 1 and the suction-pipes 6 and 7, which will draw the grain up through said suction-pipes and cause the same to be deposited in the tank 1. As the grain falls from the end of the pipe 6 the dust, dirt, and foreign matter will be separated therefrom by suction in said tank and will be carried through the openings 5 into and through the pipe 8 to the fan-casing and from thence will be driven into suitable cyclone dust-collectors. (Not shown.)

A grain-elevator constructed as herein shown and described will be simple, strong, and durable in construction, efficient in use, and well adapted to the purpose for which it is designed.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In a pneumatic grain-elevator, the combination of a suitable tank or receptacle having arranged therein near its upper end a horizontally-disposed partition, having apertures therein, a grain-suction pipe passing through the top of said tank and connected to said partition in line with an opening therein, an air-suction pipe connected to the top of the tank and communicating with said tank above said partition, an exhaust-fan chamber connected with the opposite end of said air-suction pipe, an exhaust-fan arranged in said chamber, a flexible suction-tube secured to the lower end of said grain-suction pipe and a discharge-valve arranged in the lower end of said tank, substantially as described.

In testimony whereof I have hereunto set my hand in presence of two subscribing witnesses.

SAMUEL OLSON.

Witnesses:
L. T. REIGSTAD,
BERENT F. NELSON.